(No Model.)  2 Sheets—Sheet 1.

J. C. KELEHER.
SELF LOADING CART.

No. 409,793.  Patented Aug. 27, 1889.

Witnesses.  Inventor.
John C. Keleher
By _____ Attorney.

(No Model.) 2 Sheets—Sheet 2.

J. C. KELEHER.
SELF LOADING CART.

No. 409,793. Patented Aug. 27, 1889.

Witnesses.
Edw¹ D. Kennedy
Eugene Newman

Inventor.
John C. Keleher,
By J. W. Kane, Attorney.

UNITED STATES PATENT OFFICE.

JOHN C. KELEHER, OF NEW RICHLAND, MINNESOTA.

SELF-LOADING CART.

SPECIFICATION forming part of Letters Patent No. 409,793, dated August 27, 1889.

Application filed December 31, 1888. Serial No. 295,008. (No model.)

*To all whom it may concern:*

Be it known that I, JOHN C. KELEHER, a citizen of the United States, residing at New Richland, in the county of Waseca and State of Minnesota, have invented certain new and useful Improvements in Self-Loading Manure Conveyers and Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of agricultural machines which are used for the purpose of conveying and distributing manure and other substances without the necessity of employing manual labor, and though the machine is designed especially for use in the conveyance and distribution of manure, it may also be used for other purposes in the same manner as the ordinary wheeled scraper.

The invention consists, generally, in the construction and arrangement of the bowl or scoop, and in the manner of connecting the same with the frame-work, whereby it may be tilted backward or forward or raised bodily upward, as may be necessary or desirable, and in the particular construction and arrangement of the various parts in detail, as will be hereinafter more fully set forth.

The invention is illustrated in the accompanying drawings, in which—

Figure 1:
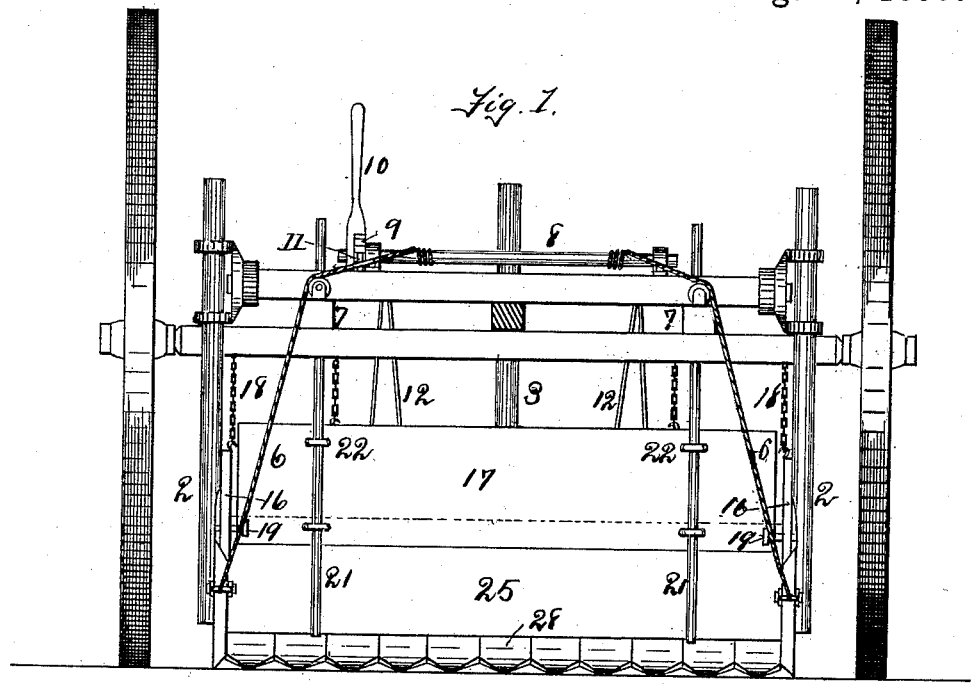
Figure 2:
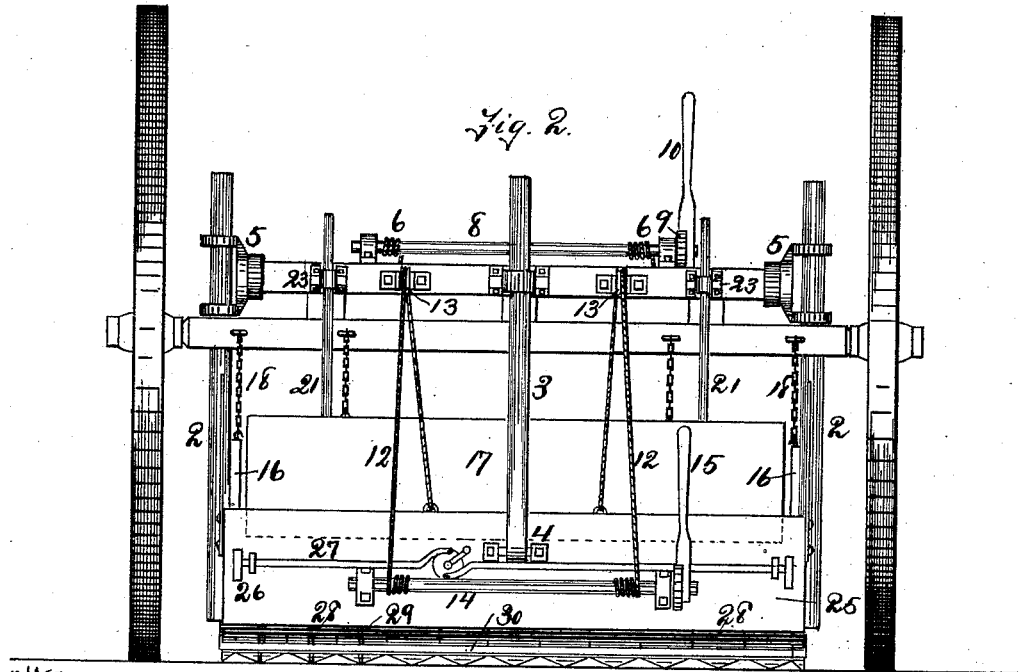
Figure 3:
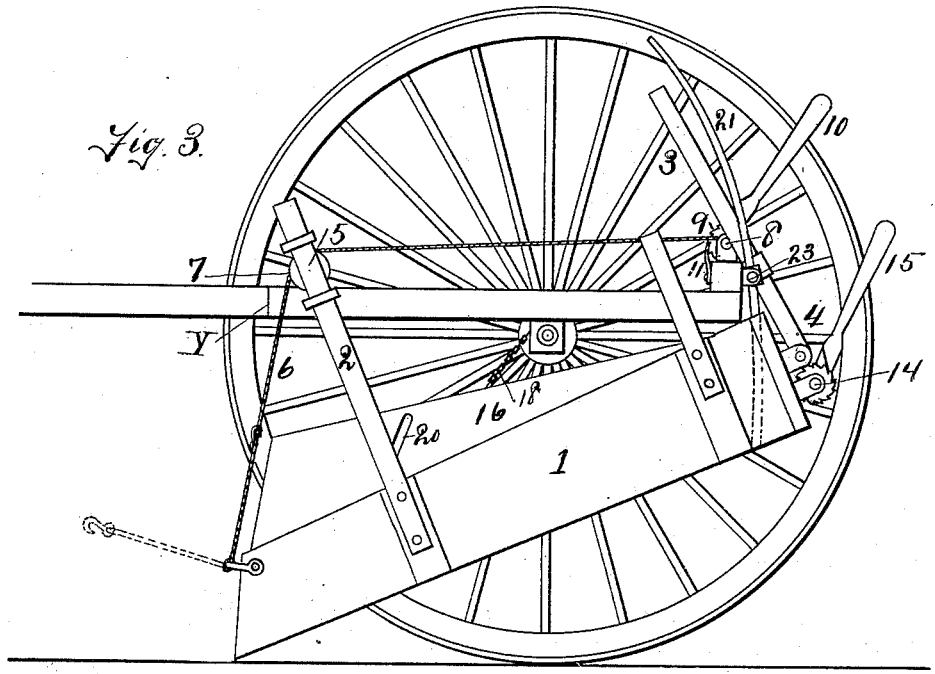

Figure 1 is a front view of the machine; Fig. 2, a rear view; Fig. 3, a side view, one wheel being removed, showing the scoop tilted forward, as in the act of loading; and Fig. 4, a similar view, showing the scoop tilted backward, as for dumping.

Like letters designate corresponding parts in all of the figures.

The bowl or scoop 1 is suspended from a suitable frame-work by means of upright arms, two of which 2 2 are rigidly secured to the sides of the scoop near the front ends thereof, and the other 3 is attached to the rear end-gate by a hinge-joint 4. All of the supporting-arms are attached to the frame-work by means of oscillating guide-bearings 5 5, by means of which construction the scoop may be raised or lowered or tilted forward or backward, though held rigidly from any lateral displacement.

Attached to the front ends of the sides of the scoop are cords or chains 6 6, passing over sheaves 7 7 upon the frame Y Y, and thence to a shaft 8 at the rear of the frame, upon which it is adapted to be wound, the shaft being operated by means of a ratchet 9 and ratchet-lever 10 to wind up the cord, and thus raise the front end of the scoop. The front of the scoop is allowed to fall of its own weight, when desired, by simply releasing the ratchet 9 by removing the detent 11 from engagement therewith. In a similar manner the rear end of the scoop may be elevated by means of cords or chains 12 12, attached to the rear end-board, passing over sheaves 13 13 upon the frame, and thence downward to a shaft 14, having ratchet-lever 15, similar to that previously described, mounted upon the end-gate. By operating both levers 10 and 15 both ends of the scoop are raised together and it is lifted bodily from the ground.

To increase the holding capacity of the scoop without at the same time making the sides of such a height as to interfere with its proper manipulation, additional sides 16 16 and rear end-gate 17 are provided. These additional sides are of about the same width as the permanent sides of the scoop, and are suspended from the frame-work by means of chains 18, so as to slightly overlap the fixed sides of the scoop when the latter is in its lowest position, as shown in Figs. 1 and 2. The sides 16 16 are held in position by means of a headed pin or bolt 19, passing through a slot 20, formed in the sides and inserted in the upright arms 2 2. The additional end-gate 17 is mounted upon rods 21 21, rising from the bottom of the scoop, to which they are secured by means of eyes or straps 22 22, thus allowing of a sliding movement up or down thereupon. These rods 21 are held in oscillating guide-bearings 23 23, similar to those by which the principal arms are supported, in order that they may afford no hinderance to the free movement of the scoop. When the scoop is raised or tilted, these additional sides, coming in contact with the frame-work, are pressed downward within the scoop, the adjacent edges of both parts being suitably beveled therefor, as shown at 24, Figs. 1 and 4.

Figure 4:
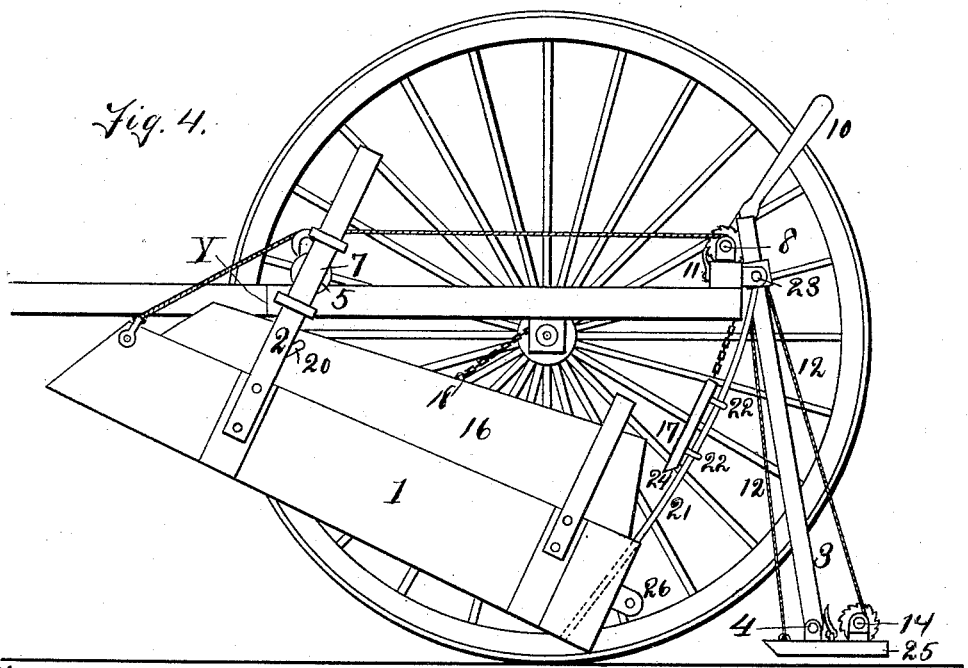

For convenience in dumping, the end-gate 25 is detachable from the body of the scoop, being attached thereto by means of lugs 26, formed or secured upon the sides, and passing through slots formed in the end-board near its extremities. Any suitable securing device, as 27, may be used to lock the end-gate in place. When it is desired to dump the contents of the scoop, the end-gate is unfastened, and the forward end of the scoop raised, as shown in Fig. 4. The end-gate falls back out of the way, but is still held in connection with the machine by means of the cords 12 12 and the arm 3. The additional end-board 17 is held up and away from the scoop by means of the chain by which it is suspended from the frame.

The bottom of the scoop is preferably constructed of a series of flat metal bars 28, pointed at the front end in such a manner as to form a series of teeth for the front edge of the scoop. The bars may be strengthened and preserved from wear by having a rib 29 formed longitudinally upon the under side of each bar. The bars and sides of the scoop are secured together by means of a metal strap 30 passing underneath the bars, countersunk therein to avoid obstruction, and having the opposite ends bent upwardly at right angles, to which bent-up portions the sides are secured.

This invention is intended, primarily, for the hauling and distributing of manure without the necessity of employing manual labor. The action is in most respects similar to that of the ordinary road-scraper, with the exception that by the use of the teeth or points shown and described as forming the front edge of the scoop it is, in addition to its other purposes, intended to act as a distributer. When it is intended to so use the machine, the rear end of the scoop is raised to a sufficient height to cause the manure to slide gradually toward the front of the scoop, assisted by the jar incident to the movement of the wheels, and by means of the teeth the manure is scattered over a space equal to the width of the scoop. By afterward plowing the field in a direction at right angles to the direction in which the manure has been scattered the distribution is thoroughly accomplished.

To change the line of draft, as may be necessary in loading the scoop, the cords or chains 6 6 may be made in two parts, as shown in dotted lines in Fig. 3, the part attached to the scoop being provided with a hook, to which the team may be attached.

The supporting-arms 2 2 and 3 are preferably made of tubular form in cross-section, that form giving the greatest strength in proportion to the weight.

I claim as my invention—

1. In combination with the frame-work mounted upon wheels, the scoop suspended therefrom by chains or equivalent means, and arms rigidly secured to said scoop and mounted in longitudinally-oscillating guide-bearings upon the frame-work, and means for winding and unwinding said suspension devices, substantially as described, whereby said scoop may be raised or lowered by said arms sliding in said bearings.

2. In combination with the frame-work mounted upon wheels, the scoop suspended at front and rear therefrom by means of cords or chains, upright arms rigidly secured to said scoop and mounted in oscillating guide-bearings upon the frame-work, and ratchet-operated shafts at front and rear, to which said suspension devices are attached, respectively, whereby either the front or rear end of the scoop may be raised or lowered independently, the said arms sliding in said guide-bearings, substantially as and for the purpose specified.

3. In combination with the frame-work mounted upon wheels, the scoop held in lateral position with reference thereto by means of upright arms rigidly secured to said scoop and mounted in longitudinally-oscillating guide-bearings upon said frame-work, suspending cords or chains attached at one end to the front of the scoop and at the other to a ratchet-lever-operated shaft upon the frame, similar cords or chains secured at one end to the rear end-gate of said scoop, passing over a sheave upon the frame-work, and attached at the other end to a ratchet-lever-operated shaft mounted upon said end-gate, and means for detaching said end-gate, substantially as and for the purpose herein specified.

4. In combination with the frame-work mounted upon wheels, the scoop held in lateral position with reference thereto by means of upright arms rigidly secured to said scoop and mounted in longitudinally-oscillating guide-bearings upon said frame-work, cords or chains suspending said scoop from the frame-work, and means, substantially as described, for raising or tilting said scoop in said bearings, and additional sides and ends suspended from said frame independently of said scoop, substantially as and for the purpose herein specified.

In testimony whereof I affix my signature in presence of two witnesses.

JOHN C. KELEHER.

Witnesses:
W. D. ABBOTT,
S. D. CRUMP.